US010321005B2

(12) United States Patent
Sugiyama

(10) Patent No.: US 10,321,005 B2
(45) Date of Patent: Jun. 11, 2019

(54) IMAGE SENSOR UNIT, PAPER SHEET DISTINGUISHING APPARATUS, IMAGE READING APPARATUS, AND IMAGE FORMING APPARATUS

(71) Applicant: CANON COMPONENTS, INC., Kodama-gun, Saitama (JP)

(72) Inventor: Takeshi Sugiyama, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/824,072

(22) Filed: Nov. 28, 2017

(65) Prior Publication Data

US 2018/0152584 A1    May 31, 2018

(30) Foreign Application Priority Data

Nov. 30, 2016   (JP) .................................. 2016-232837

(51) Int. Cl.
*H04N 1/04* (2006.01)
*H04N 1/047* (2006.01)
*H04N 1/028* (2006.01)

(52) U.S. Cl.
CPC ............ *H04N 1/047* (2013.01); *H04N 1/028* (2013.01); *H04N 2201/04729* (2013.01); *H04N 2201/04789* (2013.01)

(58) Field of Classification Search
CPC ................... H04N 1/047; H04N 1/028; H04N 2201/04729; H04N 2201/04789
USPC ......................... 358/497, 494, 482, 483, 474
See application file for complete search history.

(56) References Cited

U.S. PATENT DOCUMENTS

| 5,343,227 | A  | * | 8/1994 | Hirosawa | B41J 2/155 346/139 R |
| 6,707,584 | B1 | * | 3/2004 | Morita | H04N 1/00538 358/474 |
| 8,817,344 | B2 | * | 8/2014 | Takahara | H04N 1/1017 358/497 |
| 2008/0286518 | A1 | * | 11/2008 | Kiyota | H04N 1/1017 428/57 |
| 2018/0309896 | A1 | * | 10/2018 | Sugiyama | H04N 1/02855 |

FOREIGN PATENT DOCUMENTS

JP          2009164743 A     7/2009

* cited by examiner

*Primary Examiner* — Cheukfan Lee
(74) *Attorney, Agent, or Firm* — Rossi, Kimms & McDowell LLP

(57) ABSTRACT

An image sensor unit includes: a light condenser that collects light from the reading target object; an image sensor that receives the collected light collected and converts it into an electric signal; a housing having an elongated shape housing the light condenser and image sensor; and an elongated rigid member provided on a side surface elongated in an elongated direction of the housing. The housing has a multiple positions for fixation on the side surface. The rigid member is fixed to the side surface of the housing at at least two positions. A warping amount adjusting part is provided between the positions at which the rigid member is fixed. The warping amount adjusting part is capable of holding warping amount in the direction of the optical axis of the light condenser of the housing by intervention of a warping amount adjusting member between the rigid member and the housing.

11 Claims, 12 Drawing Sheets

F I G. 1
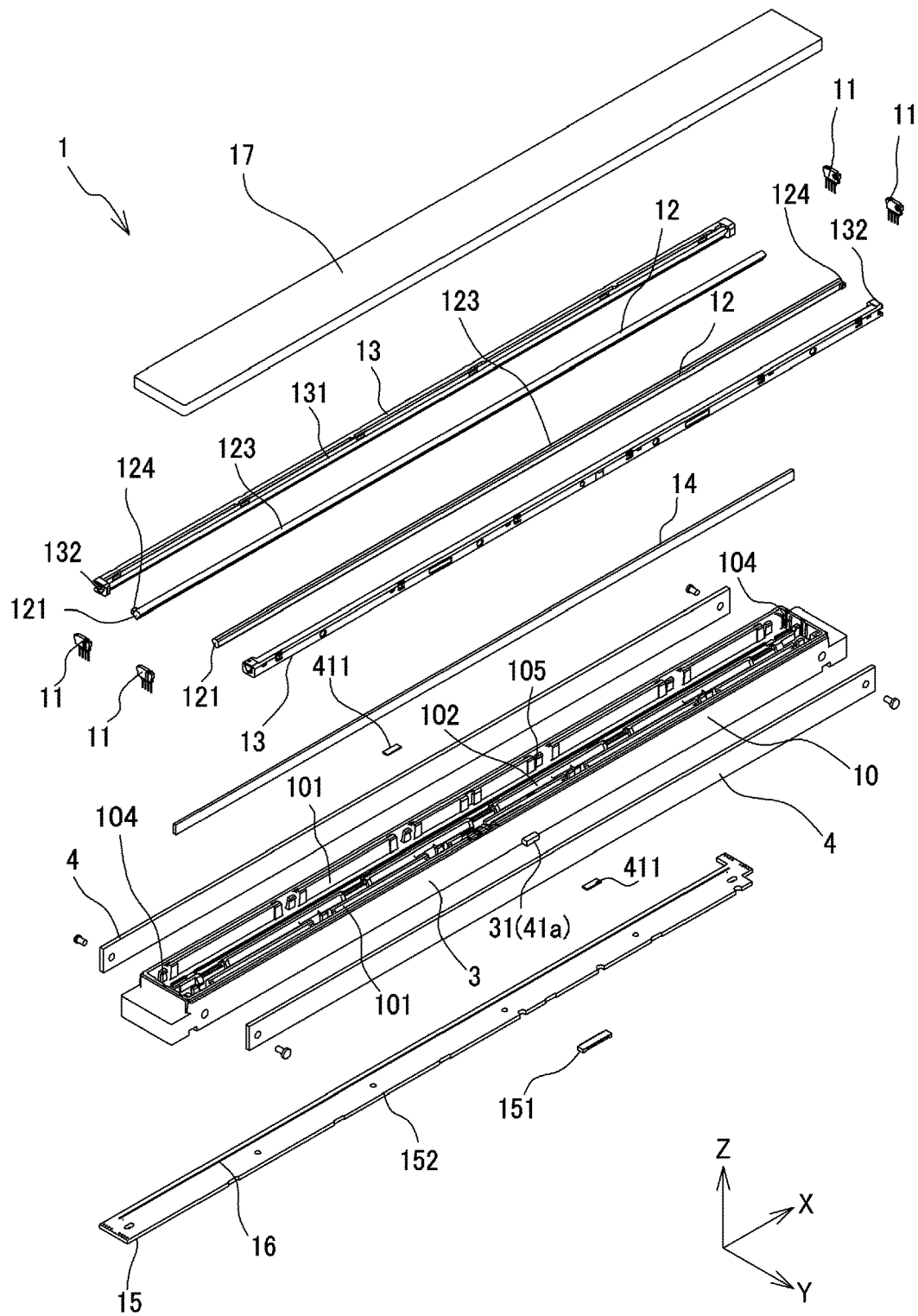

F I G. 4
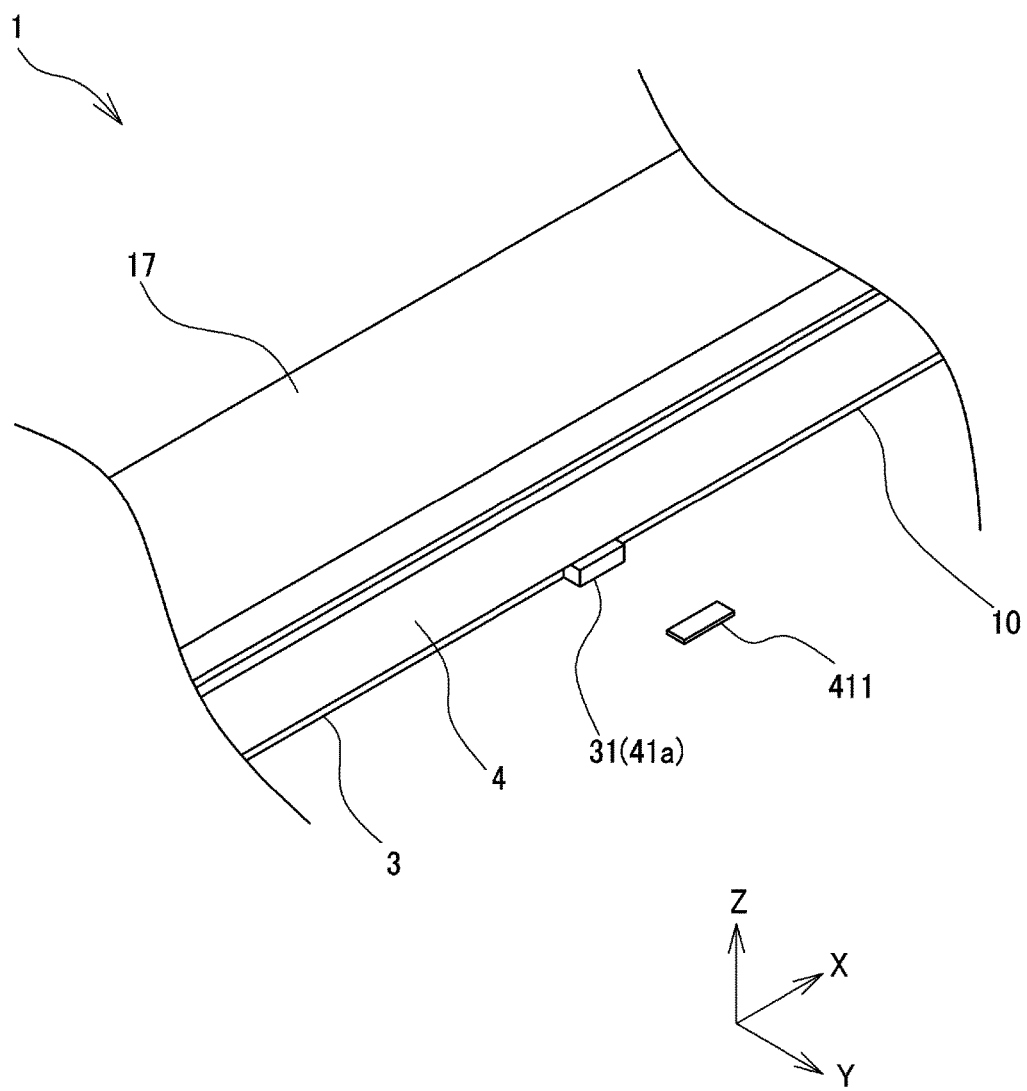

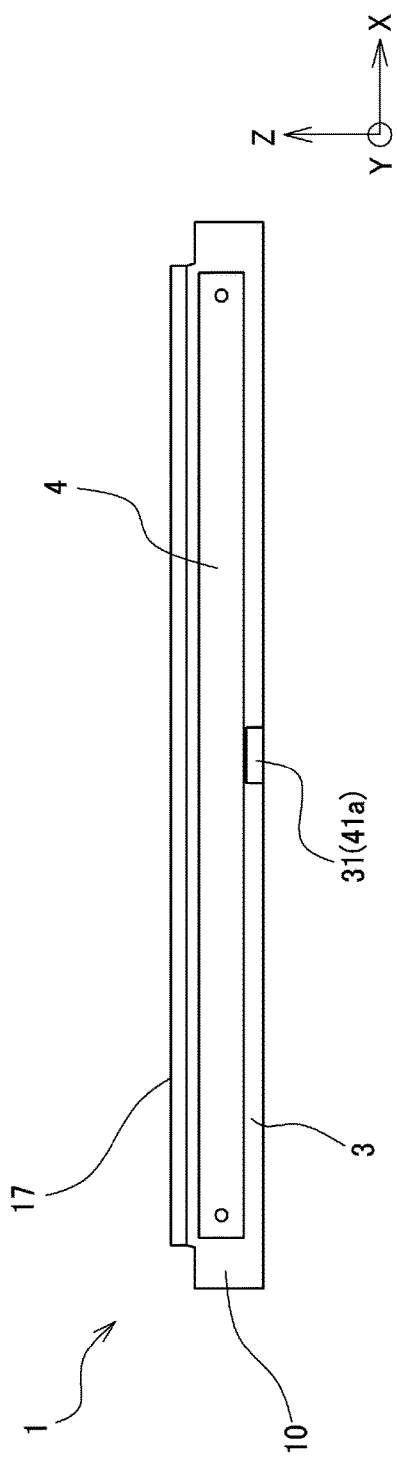
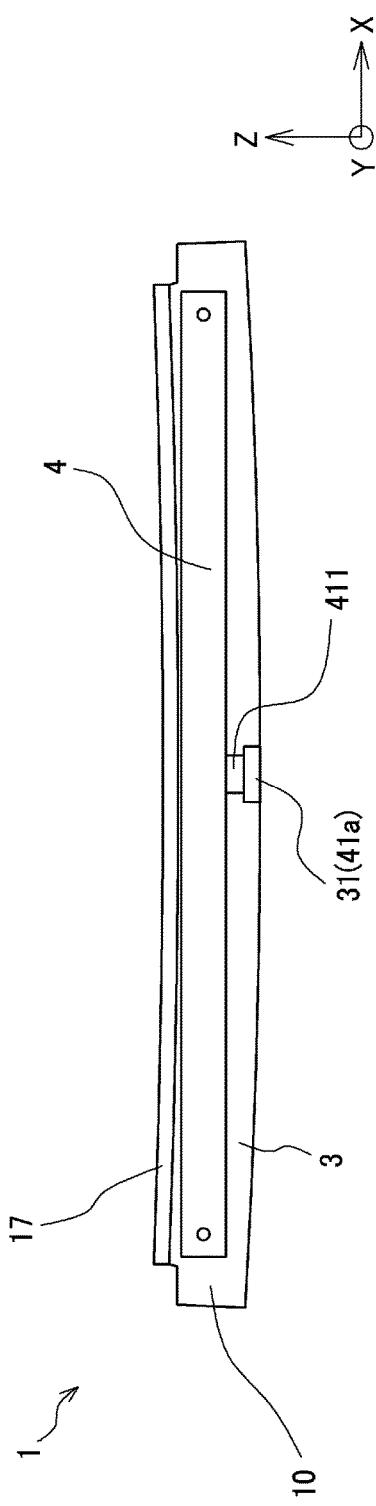

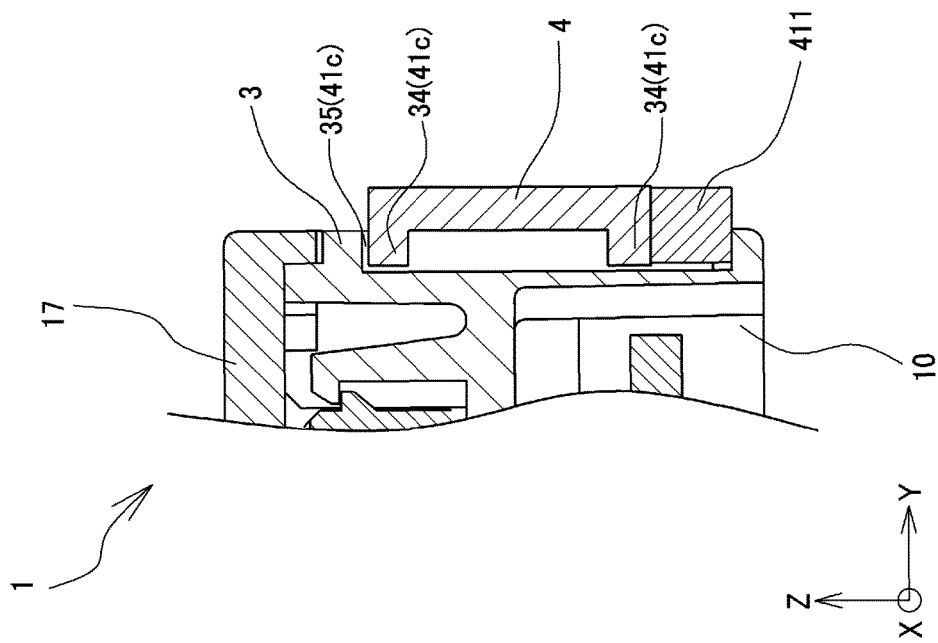
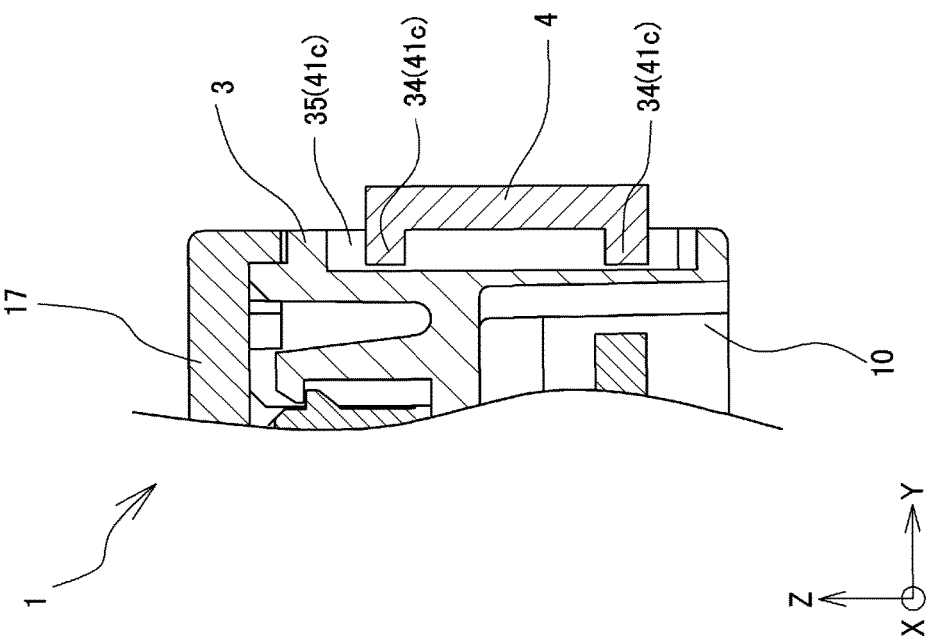

IMAGE SENSOR UNIT, PAPER SHEET DISTINGUISHING APPARATUS, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2016-232837, filed on Nov. 30, 2016, the entire contents of which are incorporated herein by reference.

BACKGROUND OF THE INVENTION

Field of the Invention

The present invention relates to an image sensor unit, a paper sheet distinguishing apparatus, an image reading apparatus, and an image forming apparatus.

Description of the Related Art

There are image reading apparatuses, such as scanners, and image forming apparatuses, such as copiers and MFPs (Multifunction Printers), to which an elongated rod-like image sensor unit is applied. Such an image reading apparatus and an image forming apparatus move the image sensor unit in a predetermined direction relatively with respect to a reading target while causing the image sensor unit to read the reading target. Such image sensor units are used with the units being intentionally warped (curved) to have a distance to the reading target object that is intentionally uneven when viewed in the predetermined direction, in some cases. The warping amount may sometimes be different for objects to be applied. Warping amounts different from a desired warping amount may sometimes occur in the image sensor units owing to the production errors of the image sensor units. The warpage is specifically prone to occurring in a case where a housing made of resin is used. Furthermore, the dimensions of parts constituting the image sensor unit vary owing to the deterioration with age of materials in some cases. In such cases, the variation in dimensions sometimes vary the warping amount of the image sensor unit. Consequently, there is a demand for the capability of adjusting the warping amount of the image sensor unit.

Patent Document 1 discloses a configuration including a cam mechanism, as a configuration of adjusting the distance between the image sensor unit and the reading target object. Such a configuration can adjust the distance to the reading target by turning a cum for each individual image sensor unit. However, Patent Document 1 does not disclose a configuration for adjusting the warping amount of the image sensor unit.

Patent Document 1

Japanese Laid-open Patent Publication No. 2009-164743

SUMMARY OF THE INVENTION

In view of the above described situation, the present invention has an object to allow the warping amount of the image sensor unit to be adjusted.

To achieve the object, the present invention is an image sensor unit capable of reading a reading target object by receiving light from the reading target object, including: a light condenser that collects light from the reading target object; an image sensor that receives the light collected by the light condenser and converts the received light into an electric signal; a housing that has an elongated shape that houses the light condenser and the image sensor; and a rigid member that has an elongated shape and is provided on a side surface elongated in an elongated direction of the housing, wherein the housing has a plurality of positions for fixation on the side surface, the rigid member is fixed to the side surface of the housing at at least two positions among the positions for fixation, and a warping amount adjusting part is provided between the positions at which the rigid member is fixed to the side surface, the warping amount adjusting part being capable of holding a warping amount in a direction of an optical axis of the light condenser of the housing by intervention of a warping amount adjusting member between the rigid member and the housing.

BRIEF DESCRIPTION OF THE DRAWINGS

FIG. 1 is an exploded perspective view schematically showing a configuration example of an image sensor unit;

FIG. 4 is a perspective view schematically showing a configuration of a warping amount adjusting part according to a first example;

FIG. 5A is a side view schematically showing adjustment of the warping amount of the housing by a warping amount adjusting part when viewed in a sub-scan direction;

FIG. 5B is a side view schematically showing adjustment of the warping amount of the housing by the warping amount adjusting part when viewed in the sub-scan direction;

FIG. 8A is a sectional view schematically showing a configuration of a warping amount adjusting part according to a third example;

FIG. 8B is a sectional view schematically showing the configuration of the warping amount adjusting part according to the third example;

DETAILED DESCRIPTION OF THE PREFERRED EMBODIMENTS

Hereinafter, embodiments to which the present invention is applicable are described in detail with reference to the drawings. The embodiments of the present invention describe an image sensor unit, and a paper sheet distinguishing apparatus, an image reading apparatus and an image forming apparatus to which the image sensor unit is applied. The image sensor unit irradiates a reading target object P, such as a paper sheet, with light, while relatively moving in a sub-scan direction, and reads the reading target object P using the reflected light or transmission light. In the present invention, "light" encompasses not only visible light but also electromagnetic waves, such as ultraviolet light and infrared light, which have a wavelength band other than that of the visible light. In each diagram, the three-dimensional directions of the image sensor unit are indicated by X, Y and Z arrows. The X-axis direction is the elongated direction of the image sensor unit, for example, the main-scan direction. The Y-axis direction is one short-hand direction of the image sensor unit, and is, for example, the sub-scan direction. The Z-axis direction is the other short-hand direction, and is, for example, the vertical direction. As for the vertical direction, a side toward the reading target object P is referred to as the upper side, and the opposite side is referred to as the lower side.

<Configuration Example of Image Sensor Unit>

Figure 2:
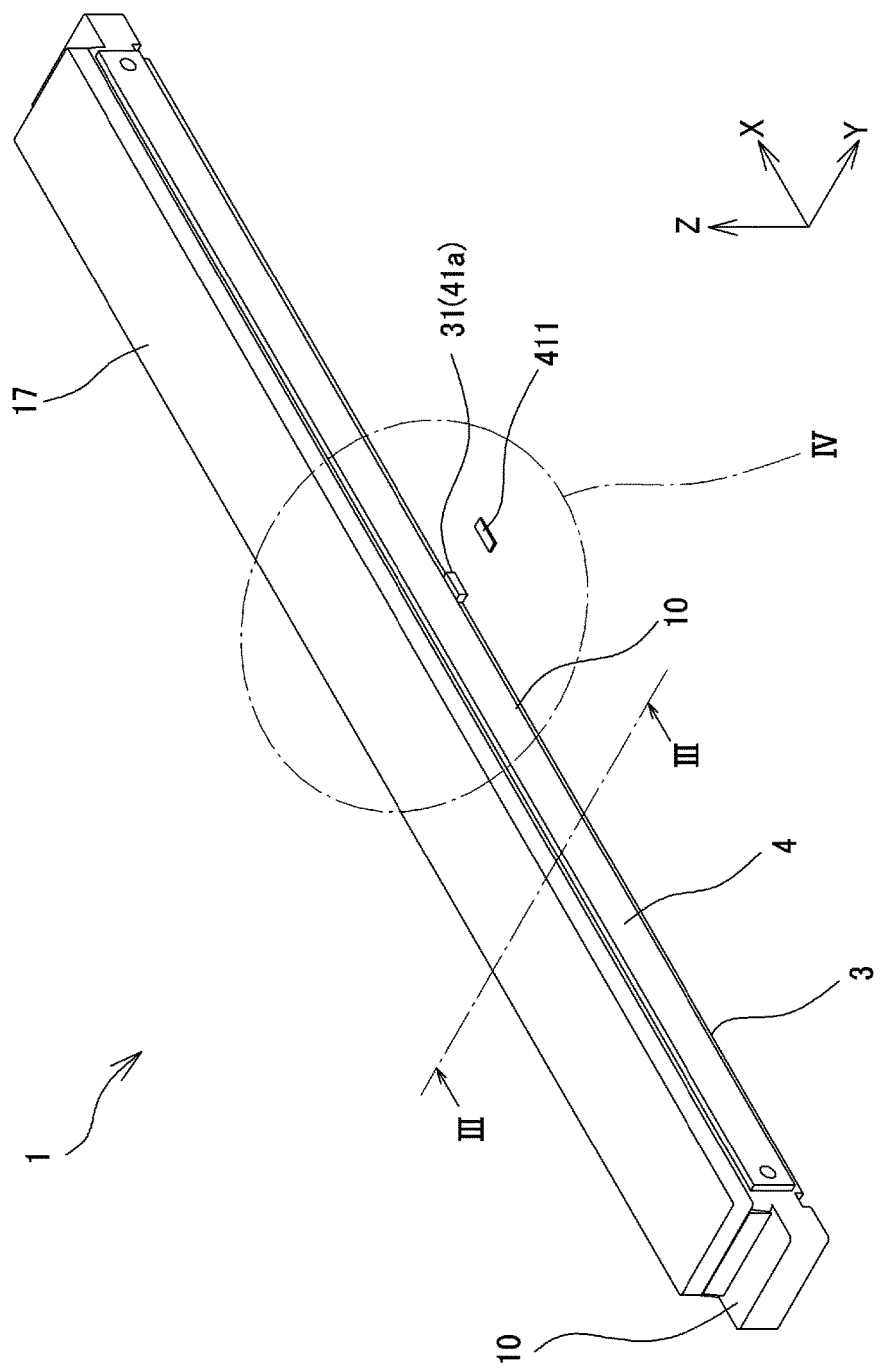
FIG. 2 is a perspective view of an appearance schematically showing the configuration example of the image sensor unit.
Figure 3:
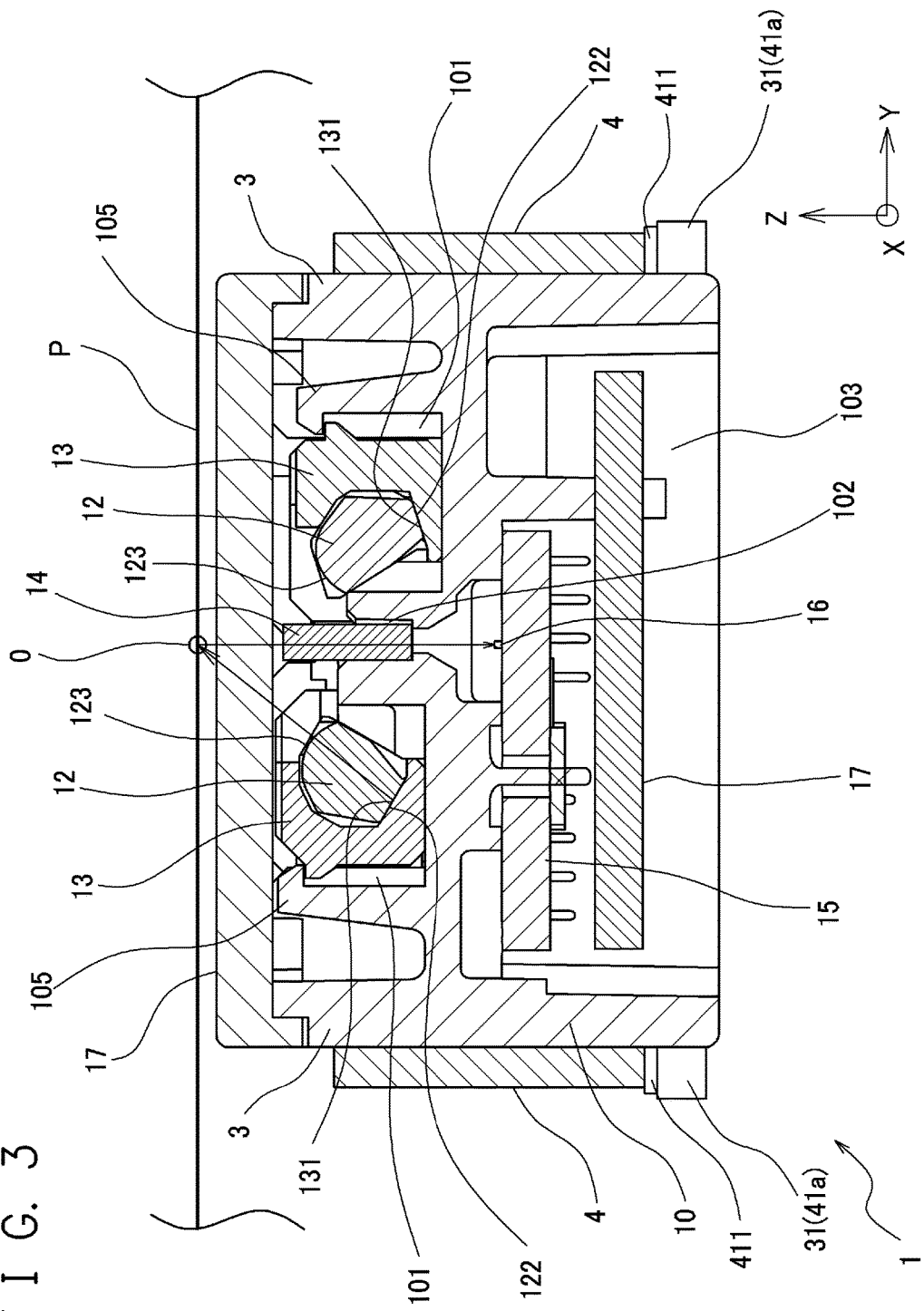
FIG. 3 is a diagram showing a sectional view of the image sensor unit 1 taken along a plane perpendicular to the elongated direction.

First, a configuration example of the image sensor unit 1 is described with reference to FIGS. 1 to 3. FIG. 1 is an exploded perspective view schematically showing the configuration example of the image sensor unit 1. FIG. 2 is a perspective view of an appearance schematically showing the configuration example of the image sensor unit 1. FIG. 3 is a sectional view taken along line III-III of FIG. 2, and is a sectional view taken along a plane perpendicular to the elongated direction (main-scan direction) of the image sensor unit 1. As shown in FIGS. 1 to 3, the image sensor unit 1 includes a housing 10, light sources 11, light guides 12, light guide covers 13, a light condenser 14, a sensor substrate 15, and a body cover 17. The image sensor unit 1 further includes: rigid members 4 for adjusting the warping amount (more specifically, the warpage in the vertical direction when viewed in the sub-scan direction) of the housing 10; and warping amount adjusting members 411.

Any of various point-like light sources, such as LED packages including LED elements, is applied as the light source 11. For example, an LED package including LED elements with emission light colors red (R), green (G), blue (B) and infrared (Ir) (wavelength ranges) is applied as the light source 11. Note that the configuration and the light emission colors of the light source 11 are not particularly limited. For example, the light source 11 may have a configuration to which an LED package including LED elements having a single type of light emission color (wavelength range) is applied.

The light source 11 is not limited to the LED package.

The light guide 12 is an optical member for linearizing light emitted from the light source 11 (achieving a linear light source) and emitting the linearized light to the outside of the image sensor unit 1 (toward the reading target object P). The light guide 12 is made of a transparent material, for example, acrylic resin, and has a rod-like shape elongated in a predetermined direction (main-scan direction) as a whole. A light incident surface 121 which the light emitted from the light source 11 has entered is provided on one or both of the end surfaces in the elongated direction (main-scan direction) of the light guide 12. FIG. 1 shows an example of a configuration where the light incident surfaces 121 are provided on both the end surfaces. On side surfaces of the light guide 12, a later-described light diffusion surface 122 (see FIG. 3) and a light emission surface 123 are provided.

The light guide 12 is provided with an engagement part 124 for positioning with respect to the light guide cover 13. For example, a projection that is provided at an end in the elongated direction and protrudes in the short-hand direction (e.g., the sub-scan direction) is applicable as the engagement part 124.

The light diffusion surface 122 of the light guide 12 is a surface that is for diffusing light having entered the light incident surface 121 and has a shape elongated in a predetermined direction (the main-scan direction in this embodiment). For example, a prism pattern (now shown) for emitting light outside of the light guide 12 is formed on the light diffusion surface 122. For example, a convex structure that has a substantially triangular section and extends in the direction orthogonal to the elongated direction (main-scan direction) is applicable to the prism pattern. Furthermore, the light diffusion surface 122 has a configuration where a dot pattern or the like for diffusing light is printed thereon. The light emission surface 123 is a surface from which the light having entered the light incident surface 121 is emitted toward the reading target object P. The light emission surface 123 has a shape elongated in the predetermined direction (main-scan direction) so as to linearlize light to be emitted from the light source 11 (achieve a linear light source).

FIG. 1 shows the configuration where the light incident surfaces 121 are provided on both the end surfaces in the elongated direction (main-scan direction) of the light guide 12. Alternatively, a configuration where the light incident surface 121 is provided only on one end surface may be adopted. FIGS. 1 and 3 show the configuration where the image sensor unit 1 includes two light guides 12. However, the number of light guides 12 included in the image sensor unit 1 is not limited thereto. For example, the image sensor unit 1 may have a configuration that includes a single light guide 12. Alternatively, this unit may have a configuration that includes three or more light guides 12.

The light guide cover 13 is a member that is attached to the light guide 12 and has a rod-like shape elongated in the predetermined direction (main-scan direction) and having a sectional shape that is taken along a plane perpendicular to the elongated direction (main-scan direction) and is formed into a substantially "U" shape or substantially "C" shape. The light guide cover 13 has a function of diffusing light, and a function of facilitating improvement in light utilization efficiency. For the sake of such functions, the light guide cover 13 is formed of a material having a high light reflectance, such as polycarbonate in which titanium oxide in powder is mixed. A light reflection surface 131 is provided in the light guide cover 13. The light reflection surface 131 is a surface that is for reflecting light emitted from the light diffusion surface 122 of the light guide 12 to the outside and causing the light to re-enter the inside of the light guide 12, and has a shape elongated in the predetermined direction (main-scan direction) like the light diffusion surface 122 of the light guide 12. A part of the inner surface of the light guide cover 13 may be the light reflection surface 131, or the entire inner surface may be the light reflection surface 131. In a case where the light guide cover 13 is attached to the light guide 12, the light reflection surface 131 of the light guide cover 13 covers the light diffusion surface 122 of the light guide 12 (the light reflection surface 131 provided for the light guide cover 13 faces the light diffusion surface 122 provided on the side surface of the light guide 12).

Engagement target parts 132 with which the engagement parts 124 of the light guide 12 can be engaged are provided in proximity to the ends of the light guide cover 13 in the elongated direction. In the case where the projections are applied as the engagement parts 124 of the light guide 12, openings or concaves with which the respective engagement parts 124 can be engaged, for example, are applied as the engagement target parts 132 provided for the light guide cover 13. When the engagement parts 124 provided for the light guide 12 are engaged with the engagement target parts 132 provided for the light guide cover 13, the light guide 12 and the light guide cover 13 are held in a state of being positioned with respect to each other.

The light condenser 14 is an optical member that focuses (collects) the light from the reading target object P on the surface of the image sensor 16 (described later). For example, a typical rod lens array (microlens array) is applicable as the light condenser 14. A typical rod lens array has a configuration where a plurality of imaging elements (rod lenses) of an erect equal magnification imaging type are linearly arranged in the elongated direction. The configuration of the light condenser 14 is not specifically limited.

The sensor substrate 15 includes a wiring board 152, an image sensor 16 provided on the wiring board 152, and the light source 11. The sensor substrate 15 may include a connector 151 for electrical connection to the outside. The wiring board 152 has a shape (e.g., substantially rectangular shape) elongated in the predetermined direction (main-scan direction) when viewed in the vertical direction. The configuration of the wiring board 152 is not specifically limited. Any of publicly known various wiring boards, such as publicly known printed circuit boards is applicable.

The image sensor 16 receives light (light from the reading target object P) focused by the light condenser 14, and converts the light into an electric signal. The image sensor 16 includes linearly arranged (one-dimensional) photoelectric conversion elements. For example, an image sensor IC array is applicable as the image sensor 16. The image sensor IC array includes multiple image sensor ICs, and is formed with these ICs being mounted on the upper surface of the wiring board 152 in a manner linearly arranged in the elongated direction. Each image sensor IC includes multiple photoelectric conversion elements (sometimes called light receiving elements) that are linearly (one-dimensionally) arranged. The configuration of the image sensor 16 is not specifically limited, only if the configuration includes linearly arranged (one-dimensional) photoelectric conversion elements. For example, the number and intervals of the photoelectric conversion elements included in the image sensor 16 are appropriately set according to the specification of the image sensor unit 1. In the configuration where the image sensor IC array is applied to the image sensor 16, the configuration of the image sensor IC that forms the image sensor IC arrays is not specifically limited either. Any of various types of image sensor ICs having already been known is applicable. Furthermore, in the case where the image sensor IC array is applied to the image sensor 16, the image sensor ICs may be arranged in multiple arrays in a staggered manner.

The housing 10 is a housing of the image sensor unit 1. The housing 10 is formed of a material having a light blocking property, for example. For example, any of various resin materials, such as black-painted polycarbonate, is applicable as the material of the housing 10. The housing 10 has a shape elongated in the predetermined direction. For example, this body has a rectangular shape elongated in the main-scan direction when viewed in the vertical direction. The housing 10 includes, light guide housing parts 101, a light condenser housing part 102, a sensor substrate housing part 103, and light source housing parts 104. The light guide housing part 101 is a region that can house the light guide 12 to which the light guide cover 13 is attached. The light condenser housing part 102 is a region that can house the light condenser 14. The sensor substrate housing part 103 is a region that houses the sensor substrate 15.

The light guide housing part 101 is a region that can house the light guide 12 to which the light guide cover 13 is attached. The light guide housing part 101 is provided in an upper area of the housing 10, is elongated in the elongated direction of the housing 10, and is open upward. A pressing piece 105 is provided on one side of the light guide housing part 101 in the sub-scan direction. The pressing piece 105 has an elastic deformable tongue-shaped configuration, and urges the light guide 12 which is housed in the light guide housing part 101 and to which the light guide cover 13 is attached, toward the opposite side in the sub-scan direction and toward the lower side in the vertical direction.

The light condenser housing part 102 is a region that can house the light condenser 14. The light condenser housing part 102 is provided in an upper area of the housing 10, is elongated in the elongated direction of the housing 10, and is open upward and downward. The opening provided at the bottom (lower side) of the light condenser housing part 102 communicates with the later-described sensor substrate housing part 103.

As shown in FIG. 1, in a case where the image sensor unit 1 includes a single light condenser 14 and two light guides 12, the housing 10 is provided with a single light condenser housing part 102 and two light guide housing parts 101. In this case, as shown in FIG. 1, the single light condenser housing part 102 is provided between the two light guide housing parts 101. In the case where the image sensor unit 1 includes a single light condenser 14 and two light guides 12, the single light condenser housing part 102 and the single light guide housing part 101 are provided in arrays arranged with respect to each other.

The sensor substrate housing part 103 is a region that can house the sensor substrate 15. As shown in FIG. 3, the sensor substrate housing part 103 is provided in a lower area of the housing 10 (more specifically, the lower areas of the light guide housing parts 101, the light condenser housing part 102 and the light source housing parts 104), and is open downward.

The light source housing part 104 is a region that can house the light source 11. The light source housing parts 104 are provided on the opposite outer sides of the light guide housing part 101 in the elongated direction in proximity to the opposite ends of the housing 10 in the elongated direction. The light source housing part 104 communicates with the light guide housing part 101 and also with the sensor substrate housing part 103.

The body cover 17 is a transparent planar member. For example, a glass plate is applied as the body cover 17. The configuration of the body cover 17 is not specifically limited only if this cover is made of a material having a high light transmittance and can cover the upper side of the housing 10.

The rigid member 4 and the warping amount adjusting member 411 are members that adjust the warping amount of the housing 10 and hold the warping state of the housing 10 and the warping amount. The rigid member 4 has an elongated shape, such as a rod-like or planar shape, which is elongated in the predetermined direction (main-scan direction). Here, "the warpage of the housing 10" means warpage with the center being concave downward when viewed in the sub-scan direction, and warpage with the center being convex upward.

The rigid member 4 has a higher rigidity than the housing 10 does (resistant to warpage). For example, in the case where the housing 10 is made of the resin material as described above, a configuration of being made of a metal material, such as steel, is applied to the rigid member 4. Note that the rigid member 4 is not limited to that made of steel. Any configuration may be adopted only if the rigid member 4 has a higher rigidity than the housing 10 does. For example, instead of the steel, any of various metal materials, such as aluminum alloys and titanium, is applicable as the rigid member 4.

The shape of the rigid member 4 is not specifically limited only if the shape is an elongated shape, such as a rod-like or planar shape, which is elongated in the predetermined direction (main-scan direction). For example, the rigid member 4 may have a substantially planar shape as a whole, or have a substantially L-shape (i.e., an angle member) or a substantially U-shape (i.e., a channel member) or the like in section. It is preferable that the shape be resistant to warping (high rigidity) in a mode with the center in the elongated direction being convex upward or a mode with this center being concave downward when viewed in the sub-scan direction. For example, in the case of the planer shape, a shape having a height (the dimension in the vertical direction) larger than the width (the dimension in the sub-scan direction) is applicable.

The warping amount adjusting member 411 is a member having a predetermined dimension in the vertical direction. The specific shape of the warping amount adjusting member 411 is not specifically limited. For example, any of various shapes, such as a sheet-like, planar, rod-like and block-like shape, is applicable as the warping amount adjusting member 411. The material of the warping amount adjusting member 411 is not specifically limited. It is preferable that the warping amount adjusting member 411 be made of a material resistant to compression deformation. For example, any of various metal materials and rigid resin materials (e.g., acrylic and polycarbonate) is applicable as the warping amount adjusting member 411.

Next, the configuration of assembling the image sensor unit 1 is described.

The light guide 12, to which the light guide cover 13 is attached, is housed in the light guide housing part 101. In a case where the light guide 12 to which the light guide cover 13 is attached is housed in the light guide housing part 101, the pressing piece 105 provided for the housing 10 urges the light guide 12 and the light guide cover 13 in one sub-scan direction and the lower side direction. Thus, the light guide 12 is in contact with the inner circumferential surface and the bottom surface in a state of being urged against these surfaces in the one sub-scan direction. Consequently, in the case where the light guide 12 is housed in the light guide housing part 101, the light guide 12 is in a state of being positioned in the sub-scan direction and the vertical direction with respect to the housing 10.

The light condenser 14 is housed in the light condenser housing part 102 with the optical axis being oriented in parallel to the vertical direction. The light condenser 14 housed in the light condenser housing part 102 is caused to adhere and fixed to the housing 10 with ultraviolet curable adhesive, for example. In a state where the image sensor unit 1 is assembled in a paper sheet distinguishing apparatus 5, an image reading apparatus 7 or an image forming apparatus 9, the upper focus of the light condenser 14 is set upper than the upper end surface of the housing 10 so as to be positioned on a reading target surface of the reading target object P. The distance from the upper end surface of the housing 10 of the image sensor unit 1 to the upper focus of the light condenser 14 is appropriately set according to the configuration (specifications) of the image sensor unit 1, and the configuration (specifications) of the paper sheet distinguishing apparatus 5, image reading apparatus 7 or image forming apparatus 9, to which the image sensor unit 1 is applied. This distance is not specifically limited.

The sensor substrate 15 is housed in the sensor substrate housing part 103. In this state, the image sensor 16 provided on the upper surface of the sensor substrate 15 is positioned on the optical axis of the light condenser 14 housed in the light condenser housing part 102. Each of the photoelectric conversion elements included in the image sensor 16 is positioned on the lower focus of the light condenser 14 housed in the light condenser housing part 102.

The light source 11 is housed in the light source housing part 104. The light source housing part 104 and the light guide housing part 101 are integrally connected to the each other. The light source 11 housed in the light source housing part 104 can emit light toward the light incident surface 121 of the light guide 12 housed in the light guide housing part 101. The light source 11 is electrically connected and physically coupled to the wiring board 152 of the sensor substrate 15 housed in the sensor substrate housing part 103.

The body cover 17 is attached to the housing 10, which houses the light guide 12, the light condenser 14 and the light source 11, from the upper side. At least parts of the body cover 17 that serve as the path of light emitted from the light guide 12 and the path of light from the reading target object P are transparent. For example, at least the parts of the body cover 17 that serve as the paths of the light are formed of glass or a transparent resin. A part of or the entire body cover 17 may be transparent. The body cover 17 is caused to adhere and fixed to the upper side of the housing 10 with ultraviolet curable adhesive, for example. In the case where the body cover 17 adheres and is fixed, a state is achieved where the light guide housing part 101, the light condenser housing part 102 and the light source housing part 104 are covered from the upper side. This configuration prevents foreign matters, such as dust, from intruding into the housing 10.

Each of the side surfaces 3 of the housing 10 is provided with multiple positions for fixation. The rigid members 4 are attached to the respective side surfaces 3 of the housing 10, and are fixed at the positions for fixation provided for the housing 10. For example, two positions at the opposite ends of the rigid member 4 in the elongated direction are fixed to two positions among the positions for fixation provided for the housing 10. For example, screw holes are applicable as the positions for fixation. In this case, the opposite ends of the rigid member 4 in the elongated direction are fixed to the respective opposite ends of the housing 10 in the elongated direction with screws or the like. It is preferable that specific fixation positions ("fixation positions" are positions at which the rigid members 4 are actually fixed to the housing 10) reside outside of the effective reading range (out of the opposite ends of the image sensor 16 in the elongated direction). At the area between the two fixation positions at the opposite ends in the elongated direction (here, the screw-fixed positions), the rigid member 4 is not fixed to the housing 10. Accordingly, the housing 10 can be displaced (deformed) in the vertical direction relatively with respect to the rigid member 4 between the two fixation positions. That is, the housing 10 can be warped so that the center in the elongated direction can be convex upward, and be warped so that the center in the elongated direction can be concave downward.

Preferably, a configuration is adopted where the rigid members 4 are attached to both of the two side surfaces 3 of the housing 10. In this case, it is preferable that the positions of the fixation positions of the rigid member 4 in the elongated direction be the same between the two side surfaces 3 (the fixation positions on one side surface 3 and the fixation positions on the other side surface 3 be overlapped with each other when viewed in the sub-scan direction) so that the housing 10 can be warped.

As described above, on the side surfaces 3 of the housing 10, multiple positions for fixation (screw holes in the above example) are provided. Each rigid member 4 is fixed to the housing 10 at least two positions among the positions for fixation. The fixation structure of the rigid member 4 is not limited to the structure described above. For example, a configuration may be adopted where the opposite ends of the housing 10 in the elongated direction are provided with bosses protruding in the sub-scan direction for fixing the rigid members 4 are provided, the opposite ends of the rigid members 4 in the elongated direction are provided with boss holes, and the bosses provided for the housing 10 are inserted into the respective boss holes provided for the rigid members 4 and are subjected to swaging. Alternatively, a configuration may be adopted where the opposite ends of the rigid members 4 are provided with protrusions protruding in the sub-scan direction, the side surfaces 3 of the housing 10 are provided with concaves for fixing the rigid members 4 to the side surfaces 3 of the housing 10, and the protrusions of the rigid members 4 are fitted into the concaves of the side surfaces 3 of the housing 10. Alternatively, a configuration may be adopted where the opposite ends of the rigid members 4 are caused to adhere and fixed to the opposite ends of the side surfaces 3 of the housing 10 with adhesive. In short, the opposite ends of the rigid members 4 in the elongated direction (i.e., at least two positions of each rigid member 4) are fixed to the opposite ends on the side surfaces 3 of the housing 10 to allow intermediate parts in the elongated direction (i.e., between the fixation positions at two positions) to be displaced (deformed) in the vertical direction with respect to the rigid members 4. Any configuration may be adopted only if the housing 10 includes multiple positions for fixing the rigid members 4, and the rigid members 4 are each fixed to at least two positions among the positions for fixation. As described above, only with a configuration where the opposite ends of the rigid members 4 in the elongated direction are fixed to the opposite ends of the side surfaces 3 of the housing 10, and the other parts (in particular, parts between the two fixation positions) are not fixed to the housing 10, the intermediate parts of the housing 10 can be displaced (deformed) in the vertical direction with respect to the rigid members 4.

The housing 10 and the rigid members 4 are provided with warping amount adjusting parts 41a to 41c that can adjust the warping amount of the housing 10 by intervention of the warping amount adjusting members 411. The warping amount adjusting parts 41a to 41c are described below.

<Reading Operation of Image Sensor Unit>

Here, an example of a reading operation by the image sensor unit 1 to read the reading target object P is described. While at least one of the image sensor unit 1 and the reading target object P is moved in the sub-scan direction (while the image sensor unit 1 is moved with respect to the reading target object P, while the reading target object P is moved with respect to the image sensor unit 1, or while the image sensor unit 1 and the reading target object P are moved with respect to each other in the opposite directions), the reading target object P is irradiated with light, and the pattern provided on the reading target object P is read using the light from the reading target object P.

The light source 11 sequentially turns on the light emitting elements having the respective colors. The light emitted from the light source 11 is incident on the light incident surfaces 121 provided on the opposite end surfaces of the light guide 12 and enters the inside of this light guide 12. The light having entered the inside of the light guide 12 and reached the light emission surface 123 is emitted from the light emission surface 123 toward a reading line O on the reading target object P. The light having entered the inside of the light guide 12 and reached the light diffusion surface 122 is emitted to the outside from a prism pattern provided on the light diffusion surface 122. The light diffusion surface 122 of the light guide 12 is covered with (faces) the light reflection surface 131 of the light guide cover 13. Consequently, the light emitted from the prism pattern is reflected and diffused by the light reflection surface 131 of the light guide cover 13, and re-enters the inside of the light guide 12 from the light diffusion surface 122 of the light guide 12. The re-entered light is emitted from the light emission surface 123 toward the reading line O on the reading target object P.

The reflected light from the reading target object P passes through the light condenser 14 housed in the light condenser housing part 102, and is focused on the image sensor 16 provided on the upper surface of the sensor substrate 15. The image sensor 16 converts the received light into an electric signal, and outputs the signal. The image sensor unit 1 then performs the above described operation while relatively moving in the sub-scan direction with respect to the reading target object P. Accordingly, the image sensor unit 1 can read the reading target object P.

Preferably, in a state where the image sensor unit 1 is assembled in the later-described paper sheet distinguishing apparatus 5, image reading apparatus 7 or image forming apparatus 9, the distance between the housing 10 and the reading target object P (the distance between the body cover 17 and the reading target object P in a case where the body cover 17 is provided) is maintained to be a predetermined direction. In this case, in the state where the image sensor unit 1 is assembled in the later-described paper sheet distinguishing apparatus 5, image reading apparatus 7 or image forming apparatus 9, the housing 10 of the image sensor unit 1 may sometimes be maintained in a warping state. For example, in view of securing the smooth and relative movement between the image sensor unit 1 and the reading target object P, the housing 10 of the image sensor unit 1 may sometimes be in a state where the intermediate part in the elongated direction is concave downward.

The warping amount may be different according to the configuration of the paper sheet distinguishing apparatus 5, image reading apparatus 7 or image forming apparatus 9, in which the image sensor unit 1 is assembled. The warping amount of the housing 10 varies with age according to the temporal deterioration of each of the members constituting the image sensor unit 1. For example, according to the configuration where the body cover 17 is caused to adhere and fixed to the housing 10 with ultraviolet curable adhesive, the adhesive is subjected to deterioration with age and the dimensions are changed. As a result, the warping amount of the housing 10 is temporarily changed in some cases. Accordingly, the housing 10 has a warping amount different from the desired amount in some cases. To solve this, in the embodiment of the present invention, the warping amount of the housing 10 is adjusted to have the desired warping amount by the warping amount adjusting parts 41a to 41c described below.

(First Example of Warping Amount Adjusting Part)

First, the warping amount adjusting part 41a according to a first example is described with reference to FIGS. 4, 5A and 5B. FIG. 4 is a perspective view schematically showing the configuration of the warping amount adjusting part 41a according to the first example, and is an enlarged diagram of IV part of FIG. 2. FIGS. 5A and 5B are side views schematically showing adjustment of the warping amount of the housing 10 by the warping amount adjusting part 41a when viewed in the sub-scan direction. FIG. 5A shows a state before use of the warping amount adjusting member 411. FIG. 5B shows a state with the warping amount adjusting member 411 being included. FIGS. 5A and 5B show the dimensions and shapes of the members in different manners from the actual ones so as to enhance the warpage of the housing 10.

On the side surface 3 of the housing 10, a warping amount adjusting convex 31 is provided between the two fixation positions at which the rigid member 4 is fixed. The specific position of the warping amount adjusting convex 31 in the elongated direction is not limited. For example, the center of the housing 10 in the elongated direction, or the center between the two fixation positions is applicable. In short, the position may be any position between the two fixation positions at which the rigid member 4 is fixed. The warping amount adjusting convex 31 is a convex that protrudes to the outside in the sub-scan direction. The warping amount adjusting convex 31 may have a configuration integrally provided for the housing 10, or a configuration where another member is fixed. The warping amount adjusting convex 31 is provided so as to be positioned below the rigid member 4 when viewed in the sub-scan direction, and is provided so that at least a part can overlap the rigid member 4 when viewed in the vertical direction (when viewed in the direction of the optical axis of the light condenser 14). The warping amount adjusting convex 31 provided for the housing 10, and the part overlapping the warping amount adjusting convex 31 of the rigid member 4 when viewed in the vertical direction (when viewed in the direction of the optical axis of the light condenser 14) form the warping amount adjusting part 41a according to the first embodiment.

That is, as shown in FIG. 5B, the warping amount adjusting member 411 is provided so as to intervene between the warping amount adjusting convex 31 and the rigid member 4, thereby allowing the housing 10 to be warped so that the center in the elongated direction can become concave downward. More specifically, between the warping amount adjusting convex 31 of the housing 10 and the lower side (lower surface) of the rigid member 4, the warping amount adjusting member 411 having a larger dimension in the vertical direction than the gap therebetween is caused to intervene. The intervention achieves the state where the gap between the housing 10 and the rigid member 4 are widened by the warping amount adjusting member 411. The housing 10 has a smaller rigidity than the rigid member 4 does. Consequently, in a case where the state is achieved where the gap is widened by the warping amount adjusting member 411, the center of the housing 10 becomes to be in the state where the center of the housing 10 is warped concave downward.

Such intervention of the warping amount adjusting member 411 between the warping amount adjusting convex 31 and the lower side (lower surface) of the rigid member 4 can hold the housing 10 in the state where its center in the elongated direction is warped concave downward. The warping amount is determined according to the dimension of the warping amount adjusting member 411 in the vertical direction. Consequently, the intervening warping amount adjusting member 411 in the vertical direction is changed, or the number of intervening warping amount adjusting members 411 is changed; such change can adjust the warping amount of the housing 10, and hold the adjusted warping amount. In particular, in a case where the housing 10 of the image sensor unit 1 is made of resin, the warpage is prone to occurring comparing to that it is made of metal. Accordingly, it is effective in the case where housing 10 used in the embodiment of the present invention is made of resin. It can be easily verified whether the warping amount of the housing 10 is adjusted by the warping amount adjusting member 411 or not, by taking out the warping amount adjusting member 411 from between the warping amount adjusting convex 31 and the lower side of the rigid member 4. That is, if the image sensor unit 1 is left in a state where the warping amount adjusting member 411 is taken out, the shape of the housing 10 returns to the shape before adjustment in a case where the warping amount has been adjusted by the warping amount adjusting member 411. Consequently, observation of the variation in shape of the housing 10 can verify whether the warping amount of the housing 10 is adjusted by the warping amount adjusting member 411 or not.

To achieve the shape of the housing 10 in the warping state being symmetrical with respect to the center in the elongated direction, it is preferable that the fixation parts at the two positions be provided at the positions symmetrical with respect to the center of the housing 10 in the elongated direction, and the warping amount adjusting convex 31 be positioned at the center of the housing 10 in the elongated direction. The positions of the two fixation parts and the warping amount adjusting convex 31 are not specifically limited. These positions are appropriately set according to the desired shape of the housing 10. In short, any configuration may be adopted only if the rigid members 4 are fixed to the housing 10 at at least two positions apart from each other in the elongated direction, and the warping amount adjusting convex 31 is positioned at the position between the two fixation positions in the elongated direction.

FIGS. 4, 5A and 5B show the configuration where the warping amount adjusting convex 31 is positioned below the rigid member 4. However, the configuration is not limited to such a configuration. The warping amount adjusting convex 31 may have a configuration of being provided above the rigid member 4. In a case where the warping amount adjusting convex 31 is provided above the rigid member 4, the intervention of the warping amount adjusting member 411 between the warping amount adjusting convex 31 and the rigid member 4 can warp the housing 10 so that the center in the elongated direction can be concave upward, and adjust the warping amount. Alternatively, a configuration may be adopted where the warping amount adjusting convexes 31 are provided above and below the rigid member 4. In this case, the housing 10 can be warped so that the center in the elongated direction can protrude upward, and can be warped so that the center in the elongated direction can be concave downward. In both the cases, the warping amount is adjustable.

Furthermore, FIGS. 4, 5A and 5B show the configuration where the single warping amount adjusting convex 31 (i.e., the warping amount adjusting part 41a at the single position) is provided on the one side surface 3 of the housing 10. However, the number of warping amount adjusting convexes 31 (the number of warping amount adjusting parts 41a) is not specifically limited. For example, a configuration may be adopted where the multiple warping amount adjusting convexes 31 are provided on the side surfaces 3 of the housing 10. In this case, the intervention of the warping amount adjusting member 411 between the warping amount adjusting convex 31 and the rigid member 4 can accurately adjust the warping amount of the housing 10.

(Second Example of Warping Amount Adjusting Part)

Figure 6:
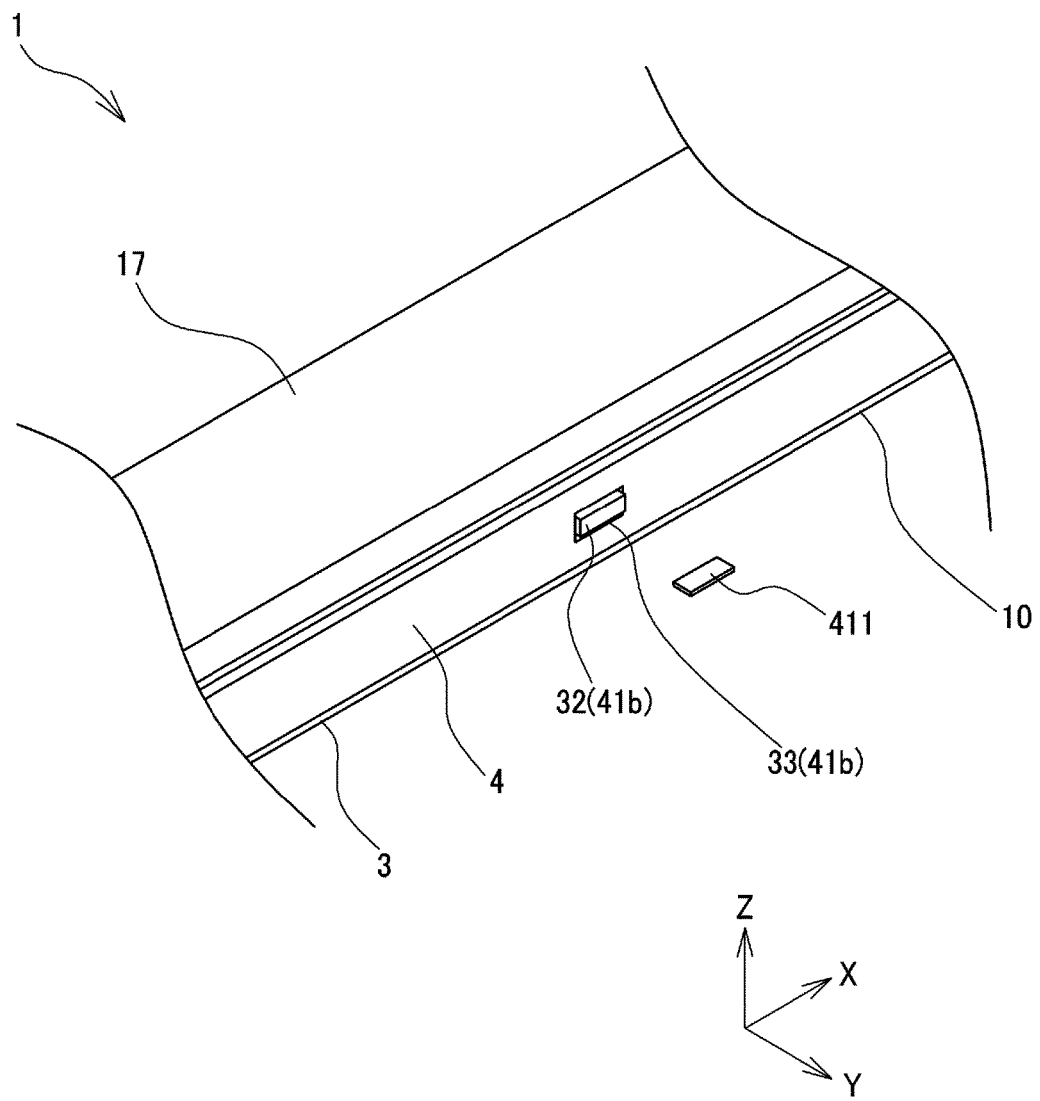
FIG. 6 is a perspective view schematically showing a configuration of a warping amount adjusting part according to a second example.
Figure 7A:
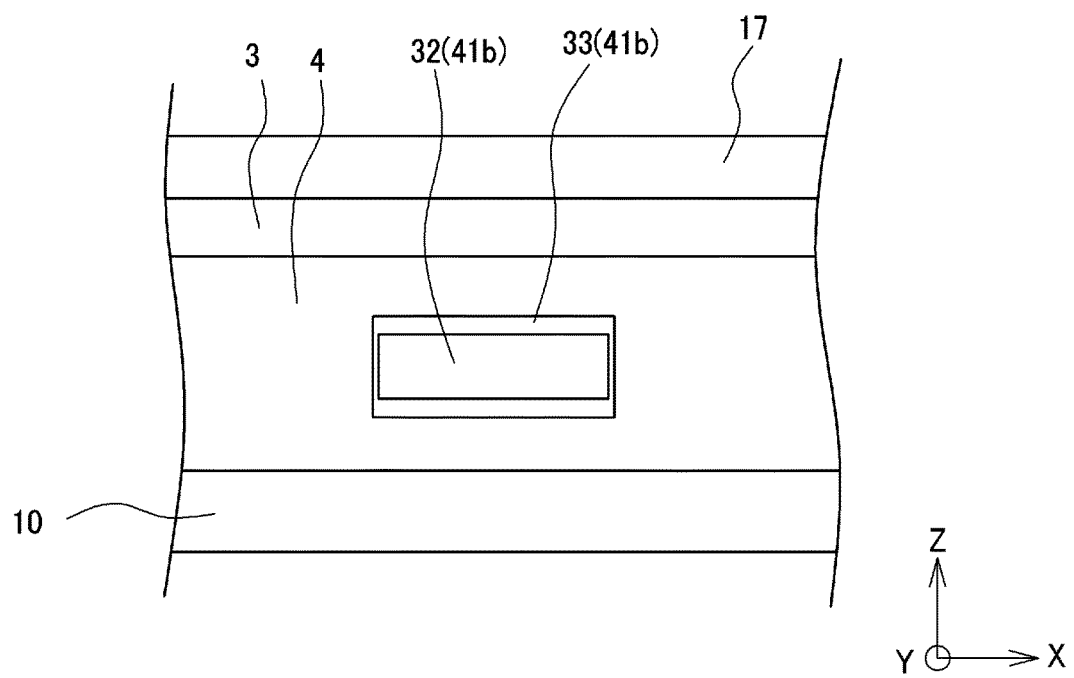
FIG. 7A is a side view schematically showing adjustment of the warping amount of the housing by the warping amount adjusting part when viewed in the sub-scan direction.
Figure 7B:
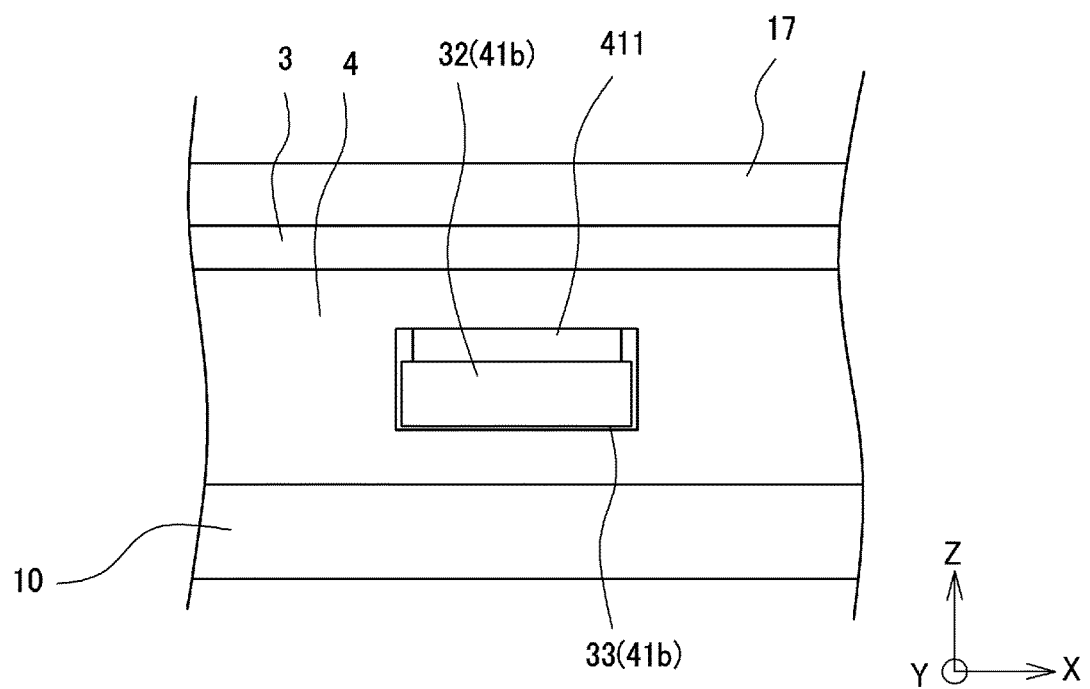
FIG. 7B is a side view schematically showing adjustment of the warping amount of the housing by the warping amount adjusting part when viewed in the sub-scan direction.

Next, the warping amount adjusting part 41b according to a second example is described with reference to FIGS. 6, 7A and 7B. Note that the same numerals are given to configuration elements common to the first example and repeated description will be omitted. FIG. 6 is a perspective view schematically showing the configuration of the warping amount adjusting part 41b according to the second example, and corresponds to an enlarged diagram of IV part of FIG. 2. FIGS. 7A and 7B are side views schematically showing adjustment of the warping amount of the housing 10 by the warping amount adjusting part 41b when viewed in the sub-scan direction. FIG. 7A shows a state before use of the warping amount adjusting member 411. FIG. 7B shows a state with the warping amount adjusting member 411 being included.

As shown in FIGS. 6, 7A and 7B, a warping amount adjusting opening 33 is provided at an intermediate part of the rigid member 4 in the elongated direction. The warping amount adjusting opening 33 is a through-hole shaped opening that penetrates in the sub-scan direction. On the side surface 3 of the housing 10, a warping amount adjusting convex 32 is provided between the two fixation positions at which the rigid member 4 is fixed. The warping amount adjusting convex 32 is a convex protruding to the outside in the sub-scan direction. A configuration element common to the warping amount adjusting convex 31 according to the first example is applicable. Note that, in the second example, the warping amount adjusting convex 32 is fit into the warping amount adjusting opening 33 provided for the rigid member 4. Accordingly, when viewed in the vertical direction (when viewed in the direction of the optical axis of the light condenser 14), at least a part of the warping amount adjusting convex 32 overlaps the inner circumferential surface of the warping amount adjusting opening 33. As described above, the warping amount adjusting convex 32 provided for the housing 10, and the inner circumferential surface of the warping amount adjusting opening 33 provided for the rigid member 4 form the warping amount adjusting part 41b according to the second example.

As shown in FIG. 7B, the intervention of the warping amount adjusting member 411 between the warping amount adjusting convex 32 of the housing 10 and the inner circumferential surface of the warping amount adjusting opening 33 of the rigid member 4 can warp the housing 10 so that the intermediate part in the elongated direction can be convex upward or can be concave downward. As described above, the intervention of the warping amount adjusting member 411 between the warping amount adjusting convex 32 of the housing 10 and the inner circumferential surface (in particular, the upper surface or lower surface) of the warping amount adjusting opening 33 of the rigid member 4 can hold the housing 10 in the warping state (can hold the warping amount). As with the first example, the warping amount is determined according to the dimension of the warping amount adjusting member 411 in the vertical direction. Consequently, the dimension of the intervening warping amount adjusting member 411 in the vertical direction is changed, or the number of intervening warping amount adjusting members 411 is changed; such change can adjust the warping amount of the housing 10.

The positions at which the warping amount adjusting convex 32 of the housing 10 and the warping amount adjusting opening 33 of the rigid member 4 are provided (i.e., the positions at which the warping amount adjusting part 41b according to the second example are provided) may be the same as the positions of the first example. As with the first example, multiple warping amount adjusting parts 41b according to the second embodiment may be provided.

(Third Example of Warping Amount Adjusting Part)

Next, a warping amount adjusting part 41c according to a third example is described with reference to FIGS. 8A and 8B. Note that the same numerals are given to configuration elements common to the first example and repeated description will be omitted. FIGS. 8A and 8B are sectional views schematically showing the configuration of the warping amount adjusting part 41c according to the third example. FIG. 8A shows a state before use of the warping amount adjusting member 411. FIG. 8B shows a state with the warping amount adjusting member 411 being included.

On the side surface 3 of the housing 10, a warping amount adjusting concave 35 is provided between the two fixation positions at which the rigid member 4 is fixed. A concave toward the inside in the sub-scan direction is applicable as the warping amount adjusting concave 35. On the other hand, the intermediate part of the rigid member 4 in the elongated direction is provided with warping amount adjusting convexes 34 that protrude in the sub-scan direction toward the side surface 3 of the housing 10. The warping amount adjusting convexes 34 provided for the rigid member 4 are fit into the warping amount adjusting concave 35 provided on the side surface 3 of the housing 10. Accordingly, when viewed in the vertical direction (when viewed in the direction of the optical axis of the light condenser 14), at least parts of the warping amount adjusting convexes 34 for the rigid member 4 overlaps the inner circumferential surfaces of the warping amount adjusting concave 35 for the housing 10. As described above, the warping amount adjusting convexes 34 provided for the rigid member 4, and the inner circumferential surfaces of the warping amount adjusting concave 35 provided for the housing 10 form the warping amount adjusting part 41c according to the third example.

As shown in FIG. 8B, the intervention of the warping amount adjusting member 411 between the warping amount adjusting convex 34 provided for the rigid member 4 and the inner circumferential surface of the warping amount adjusting concave 35 on the side surface 3 of the housing 10 can warp the housing 10 so that the intermediate part in the elongated direction can be convex upward or can be concave downward. As described above, the intervention of the warping amount adjusting member 411 between the warping amount adjusting convex 34 provided for the rigid member 4 and the inner circumferential surface (in particular, the upper surface or lower surface) of the warping amount adjusting concave 35 provided for the housing 10 can hold the housing 10 in the warping state (can hold the warping amount). As with the first example, the warping amount is determined according to the dimension of the warping amount adjusting member 411 in the vertical direction. Consequently, the dimension of the intervening warping amount adjusting member 411 in the vertical direction is changed, or the number of intervening warping amount adjusting members 411 is changed; such change can adjust the warping amount of the housing 10.

The positions at which the warping amount adjusting convexes 34 of the rigid member 4 and the warping amount adjusting concave 35 of the housing 10 are provided (i.e., the positions at which the warping amount adjusting part 41c according to the third example is provided) may be the same as the positions of the first example. As with the first example, multiple warping amount adjusting parts 41c according to the third embodiment may be provided.

The specific shapes of the warping amount adjusting convexes 34 provided for the rigid member 4, and the warping amount adjusting concave 35 provided for the housing 10 are not limited. In short, any configuration may be adopted only if a gap in the vertical direction is provided between the outer circumferential surfaces of the warping amount adjusting convexes 34 of the rigid member 4 and the inner surfaces (the upper surface and the lower surface) of the warping amount adjusting concave 35 of the housing 10.

<Paper Sheet Distinguishing Apparatus>

Figure 9:
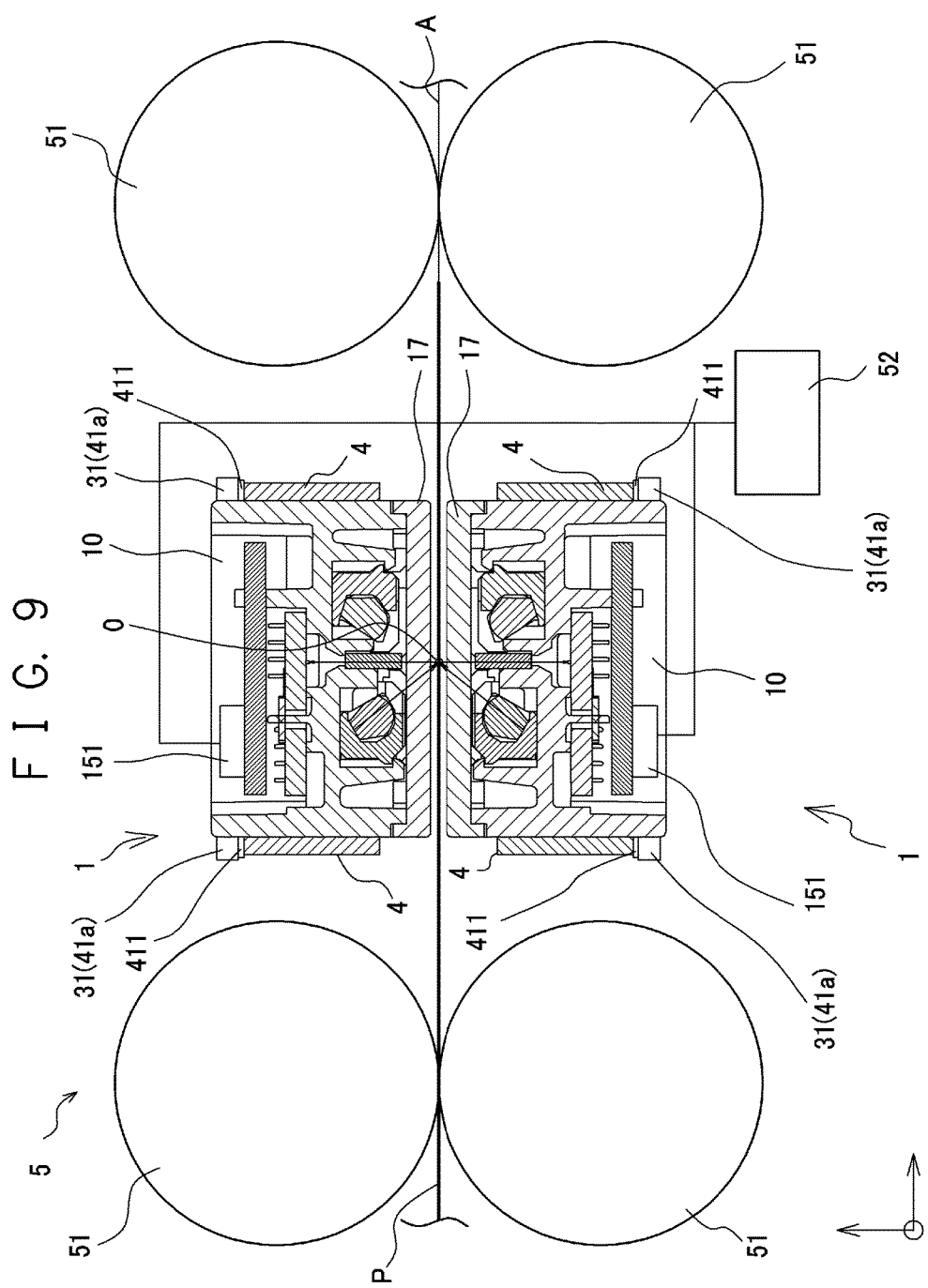
FIG. 9 is a diagram schematically showing a configuration example of an essential part of a paper sheet distinguishing apparatus.

Next, a paper sheet distinguishing apparatus 5 to which the image sensor unit 1 is applied is described with reference to FIG. 9. FIG. 9 is a diagram schematically showing the configuration of essential parts of the paper sheet distinguishing apparatus 5, and is a diagram showing a section taken along a plane perpendicular to the elongated direction.

The paper sheet distinguishing apparatus 5 irradiates a paper sheet that is a reading target object P, for example, a bill, with light, reads the light from the bill, and distinguishes the type of the bill and authenticates the bill using the read light. The light source 11 provided for the sensor substrate 15 of the image sensor unit 1 applied to the paper sheet distinguishing apparatus 5 can emit visible light, infrared light and ultraviolet light.

As shown in FIG. 9, the paper sheet distinguishing apparatus 5 includes: two image sensor units 1; conveyor rollers 51 that convey a bill; and a distinguishing part 52 that is wiredly connected to the connector 151 of the image sensor unit 1 and serves as distinguishing means. In the paper sheet distinguishing apparatus 5, a conveyance path A for conveying the bill in the sub-scan direction is set. The two image sensor units 1 are provided opposite to each other with the conveyance path A for the bill intervening therebetween. The upper (bill-side) focus of the light condenser 14 is set at the center of the conveyance path A in the vertical direction.

The operation of the paper sheet distinguishing apparatus 5 having such a configuration is as follows. Each of the two image sensor units 1 applied to the paper sheet distinguishing apparatus 5 reads a predetermined pattern provided on the bill as a visible light image according to the operation described above. Furthermore, an infrared image of the bill is read, and an ultraviolet image of the bill is read. Light with emitted from the light emission surface 123 of the light guide 12 of the image sensor unit 1 to the bill transmits through the bill, enters the light condenser 14 of the other image sensor unit 1, and is focused on the image sensor 16 of the other image sensor unit 1. The image sensor 16 of the image sensor unit 1 reads the received transmission light as the visible light image, the infrared image and the ultraviolet image. As described above, the paper sheet distinguishing apparatus 5 can perform reflection reading of both the surfaces of the bill, and can perform transmission reading.

Subsequently, the image distinguishing part 52 compares an authentic bill image obtained by irradiating a bill that is a preliminarily prepared authentic bill with visible light, infrared light, and ultraviolet light, with the visible light image, infrared image and ultraviolet image of the bill that are determination targets in a case of authentication, thereby authenticating the bill. This is because the bill that is an authentic bill is provided with a region whose images obtained under visible light, infrared light, and ultraviolet light are different from each other. The parts whose description and illustration are omitted may have the same configuration elements of the conventional paper sheet distinguishing apparatus. The distinguishing part 52 may have a configuration of being provided on the sensor substrate 15 of the image sensor unit 1.

Here, the configuration where the paper sheet distinguishing apparatus 5 includes the two image sensor units 1 has been exemplified. However, the paper sheet distinguishing apparatus 5 according to the embodiment of the present invention is not limited to the configuration that includes the two image sensor units 1. For example, a configuration may be adopted that includes a transmission light source instead of one of the two image sensor units 1. That is, the paper sheet distinguishing apparatus 5 may have a configuration that includes a single image sensor unit 1, and a transmission light source provided opposite to the image sensor unit 1. In this case, as with the image sensor unit 1, the transmission light source can irradiate the reading line O on the bill with linear light having a predetermined wavelength range. Such a configuration can perform reflection reading of a surface of the bill, and can perform transmission reading of the bill. Alternatively, the paper sheet distinguishing apparatus 5 may have a configuration that includes a single image sensor unit 1, and no transmission light source. In this case, the paper sheet distinguishing apparatus 5 can perform reflection reading of one surface of the bill.

In this embodiment, the configuration is described that irradiate the bill with visible light, infrared light and ultraviolet light to read the bill as the visible light image, infrared image and ultraviolet image. However, the configuration is not limited thereto. For example, a configuration may be adopted that emits one or two of the visible light, infrared light and ultraviolet light. The configuration where the bill is applied as the paper sheet that is the reading target object P has been described. However, the type of the paper sheet is not limited. For example, various securities and ID cards can be read.

<Image Reading Apparatus>

Figure 10:
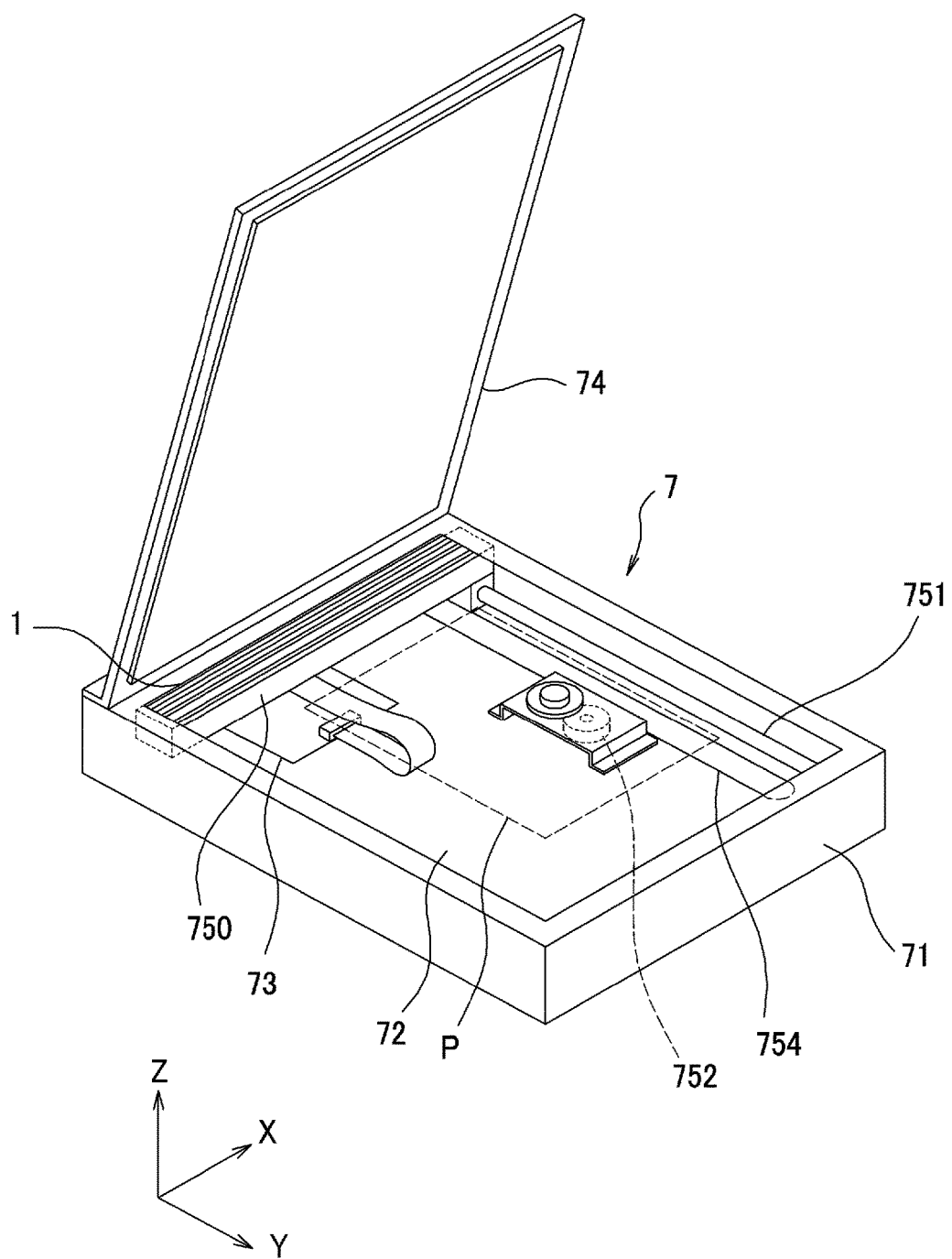
FIG. 10 is a perspective view of an appearance schematically showing a configuration example of an image reading apparatus.

Next, a configuration example of an image reading apparatus 7 is described with reference to FIG. 10. FIG. 10 is a perspective view schematically showing the appearance of the configuration example of the image reading apparatus 7 to which the image sensor unit 1 that is an embodiment of the present invention is applicable. In this embodiment, a flatbed-type scanner is described as the image reading apparatus 7. The image reading apparatus 7 includes a housing 71, a platen glass that is an example of a mount member 72, an image sensor unit 1, a drive mechanism that drives the image sensor unit 1, a circuit substrate 73, and a platen cover 74. The platen glass that is the example of the mount member 72 is made up of a transparent plate, such as glass, and is attached onto the upper surface of the housing 71. The platen cover 74 is attached to the housing 71 so as to be openable and closable through a hinge mechanism and to cover the reading target object P mounted on the mount member 72. The image sensor unit 1, the drive mechanism for driving the image sensor unit 1, and the circuit substrate 73 are housed in the housing 71.

The drive mechanism includes a holding member 750, a guide shaft 751, a drive motor 752, and a wire 754. The holding member 750 holds the image sensor unit 1 so as to surround this unit. The guide shaft 751 guides the holding member 750 so that this member can move in the reading direction (sub-scan direction) along the mount member 72. The drive motor 752 and the holding member 750 are coupled to each other via the wire 754, and moves the holding member 750, which holds the image sensor unit 1, by a drive force by the drive motor 752. The image sensor unit 1 then reads the reading target object P mounted on the mount member 72 while being moved in the sub-scan direction by the drive force of the drive motor 752. As described above, the image reading apparatus 7 reads the reading target object P while the image sensor unit 1 and the reading target object P are relatively moved in the sub-scan direction.

An image processing circuit that applies predetermined image processing to an image read by the image sensor unit 1, a control circuit that controls each part of the image reading apparatus 7 that includes the image sensor unit 1, and a power source circuit that supplies electric power to each part of the image reading apparatus 7 are constructed on the circuit substrate 73.

The flatbed-type scanner has been described as the example of the image reading apparatus 7 that includes the image sensor unit 1 to which the present invention is applicable. However, the image reading apparatus 7 is not limited to the flatbed-type scanner. In short, any image reading apparatus may be adopted only if this apparatus has the configuration that includes the mount member 72, such as the platen glass on which the reading target object P is mounted, and reads the reading target object P while sliding the image sensor unit 1 on the mount member 72.

<Image Forming Apparatus>

Figure 11:
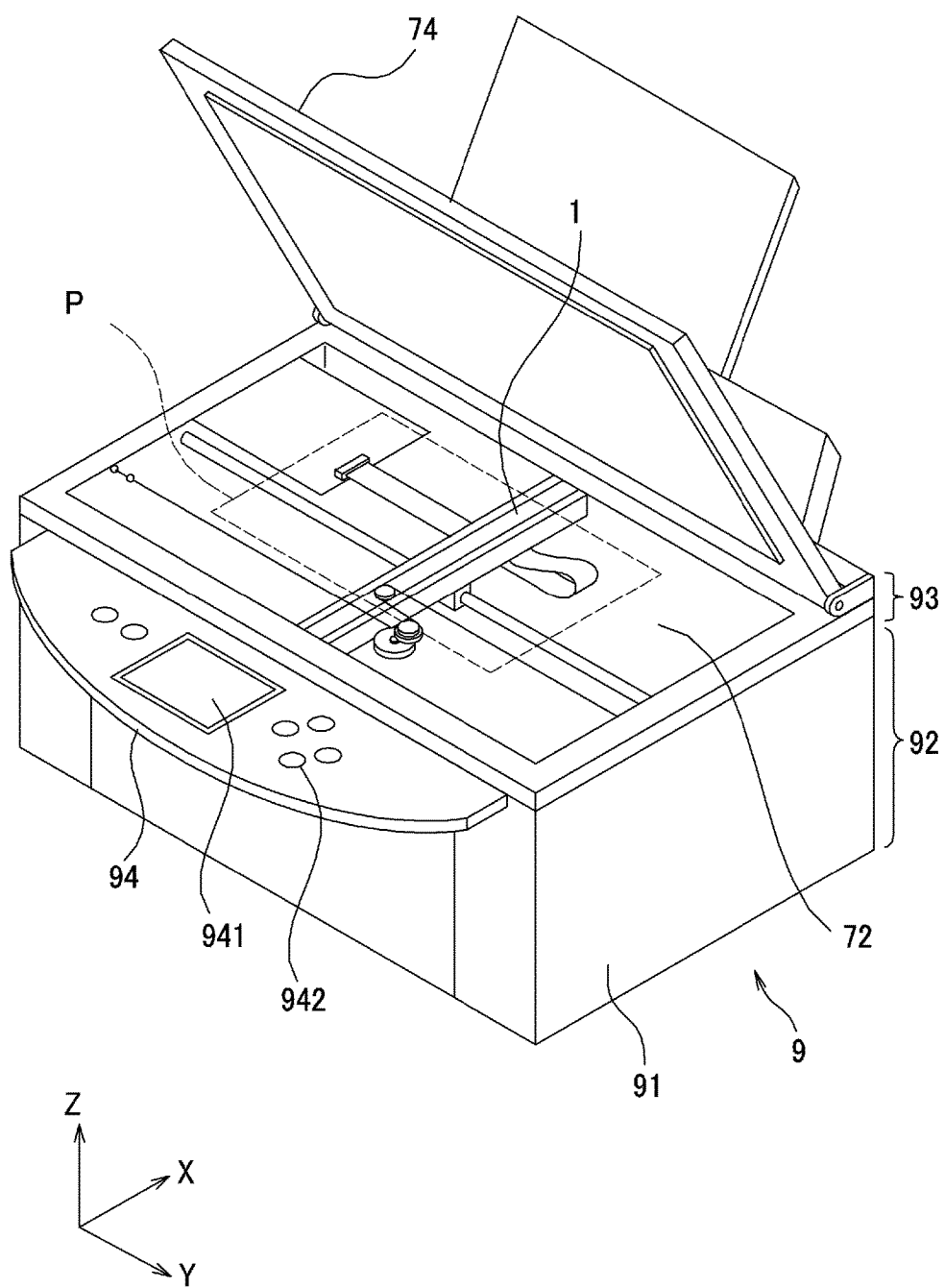
FIG. 11 is a perspective view showing an appearance of an image forming apparatus.
Figure 12:
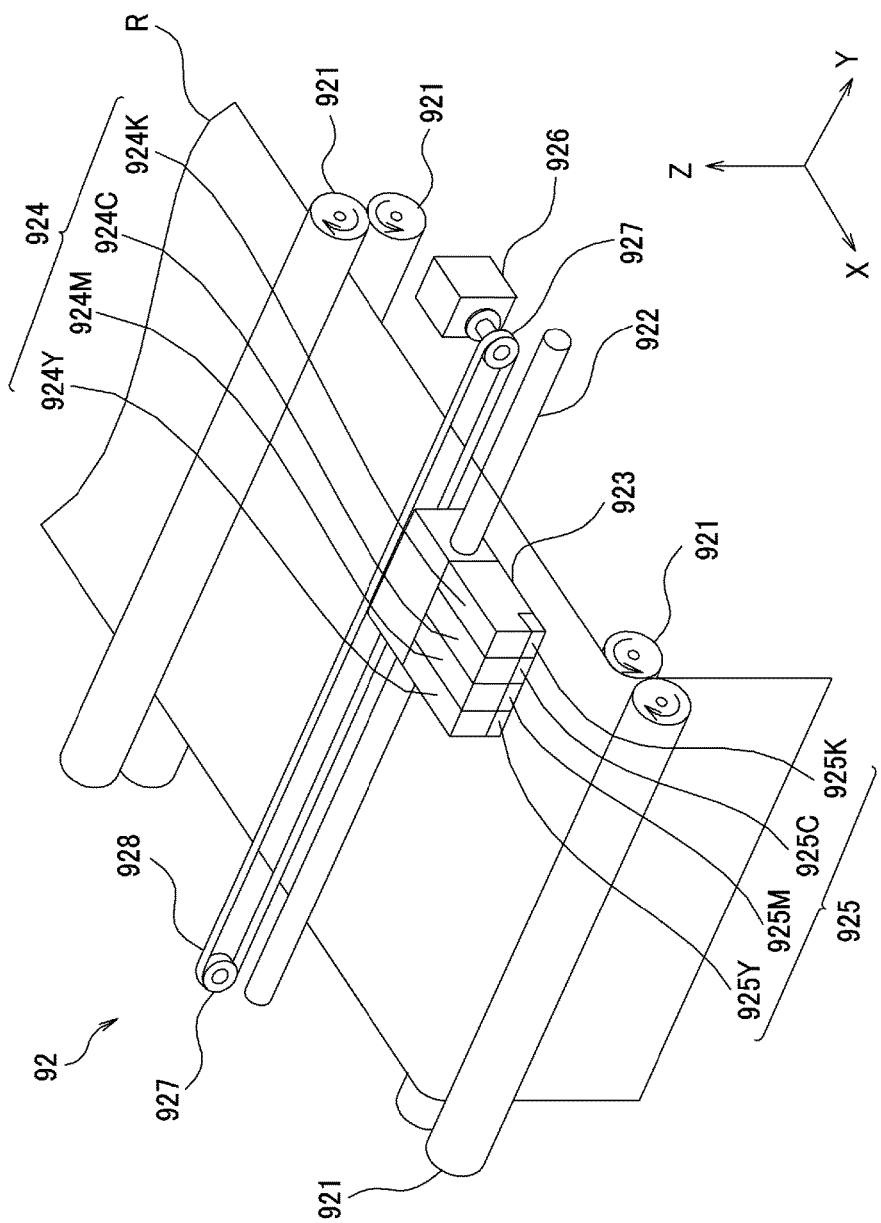
FIG. 12 is a perspective view showing an image forming part in the image forming apparatus.

Next, an image forming apparatus 9 that is an embodiment of the present invention is described with reference to FIGS. 11 and 12. The image sensor unit 1 that is the embodiment of the present invention is applied as the image forming apparatus 9 that is the embodiment of the present invention. FIG. 11 is a perspective view showing the appearance of the image forming apparatus 9. FIG. 12 is a perspective view showing an image forming part 92 provided in a housing 91 of the image forming apparatus 9 in a manner with this part being extracted. As shown in FIGS. 11 and 12, the image forming apparatus 9 is a multifunction printer (MFP) in which a flatbed-type scanner and an inkjet-type printer are combined. The image forming apparatus 9 includes an image reading part 93 as image reading means for reading an image, and an image forming part 92 as image forming means for forming an image. The image sensor unit 1 is installed in the image reading part 93 of the image forming apparatus 9. The configuration common to that of the above-described image reading apparatus 7 can be applied to the image reading part 93 of the image forming apparatus 9. Consequently, description of configuration elements common to those of the image reading apparatus 7 is omitted.

As shown in FIG. 11, the image forming apparatus 9 includes an operation part 94. The operation part 94 includes a display part 941 that displays an operation menu and various messages, and various operation buttons 942 for operation for the image forming apparatus 9. As shown in FIG. 12, the image forming part 92 is provided in the housing 91 of the image forming apparatus 9. The image forming part 92 includes conveyor rollers 921, a guide shaft 922, an inkjet cartridge 923, a motor 926, and a pair of timing pulleys 927. The conveyor rollers 921 are rotated by the drive force of a drive source to convey a printer sheet R as a recording medium in the sub-scan direction. The guide shaft 922 is a member having a rod-like shape, and is fixed to the housing 91 of the image forming apparatus 9 so that its axis can be parallel to the width direction of the printer sheet R.

The inkjet cartridge 923 can move to and fro in the width direction of the printer sheet R by sliding along the guide shaft 922. The inkjet cartridge 923 includes, for example, ink tanks 924 (924C, 924M, 924Y and 924K) that contain cyan C, magenta M, yellow Y, and black K inks, and discharge heads 925 (925C, 925M, 925Y and 925K) provided for the respective ink tanks 924. One of the pair of the timing pulleys 927 is attached to a rotation shaft of the motor 926. The pair of timing pulleys 927 are provided at positions apart from each other in the width direction of the printer sheet R. A timing belt 928 is wound around the pair of timing pulleys 927 in a manner of being wound parallel, and a predetermined point of this belt is coupled to the inkjet cartridge 923.

The image reading part 93 of the image forming apparatus 9 converts an image read by the image sensor unit 1 into an electric signal in a format suitable for printing. The image forming part 92 of the image forming apparatus 9 drives the conveyor rollers 921, the motor 926 and the inkjet cartridges 923, and forms an image on the printer sheet R on the basis of the electric signal converted by the image sensor unit 1 of the image reading part 93. Furthermore, the image forming part 92 of the image forming apparatus 9 can form an image on the basis of an electric signal input from the outside. The image forming part 92 in the image forming apparatus 9 may have the same configuration and operation as those of various conventionally, publicly known printers. Accordingly, the detailed description is omitted. The inkjet-type image forming apparatus has been described as the image forming part 92. Alternatively, any of the electronic photograph, thermal transfer, and dot impact types may be adopted.

The embodiments and exemplary examples of the present invention have been described above in detail. These embodiments and exemplary examples described above are only specific examples for implementation of the present invention. The technical scope of the present invention is not limited to the embodiments and exemplary examples described above. The present invention can be variously changed in a range without departing from the spirit thereof.

For example, the image reading apparatus to which the present invention is applicable is not limited to the image scanner that has the configuration described in the embodiment described above. Furthermore, the image forming apparatus is not limited to the inkjet-type one. Alternatively, any of electrophotographic, thermal transfer, and dot impact types may be adopted. The apparatus is not limited to the multifunction printer described in the embodiments described above. The copier and facsimile to which the image sensor unit according to the present invention is applied are encompassed by the image reading apparatus of the present invention.

The present invention is effectively utilized for the image sensor unit, and the paper sheet distinguishing apparatus, image reading apparatus and image forming apparatus (e.g., the image scanner, facsimile, copier, multifunction printer, etc.) to which this image sensor unit is applied.

The present invention can adjust the warping amount of the image sensor unit.

What is claimed is:

1. An image sensor unit capable of reading a reading target object by receiving light from the reading target object, comprising:

a light condenser that collects light from the reading target object;

an image sensor that receives the light collected by the light condenser and converts the received light into an electric signal;

a housing that has an elongated shape that houses the light condenser and the image sensor; and a rigid member that has an elongated shape and is provided on a side surface elongated in an elongated direction of the housing, wherein the housing has a plurality of positions for fixation on the side surface, the rigid member is fixed to the side surface of the housing at at least two positions among the plurality of positions for fixation, and a warping amount adjusting part is provided between the positions at which the rigid member is fixed to the side surface, the warping amount adjusting part being capable of holding a warping amount in a direction of an optical axis of the light condenser of the housing by intervention of a warping amount adjusting member between the rigid member and the housing.

2. The image sensor unit according to claim 1, wherein the warping amount adjusting part is a part at which the housing and the rigid member overlap each other when viewed in the direction of the optical axis of the light condenser.

3. The image sensor unit according to claim 2, wherein a convex is provided on the side surface of the housing, and the convex overlaps the rigid member when viewed in the direction of the optical axis of the light condenser, to form the warping amount adjusting part.

4. The image sensor unit according to claim 3, wherein the rigid member is provided with an opening, and the convex is fit into the opening.

5. The image sensor unit according to claim 2, wherein the side surface of the housing is provided with a concave, the rigid member is provided with a convex that protrudes toward the housing, and the convex is fit into the concave.

6. The image sensor unit according to claim 1, wherein the warping amount adjusting part is provided with the warping amount adjusting part so as to intervene between the housing and the rigid member.

7. The image sensor unit according to claim 1, wherein the housing is formed of a resin material, and the rigid member is formed of a metal material.

8. The image sensor unit according to claim 1, wherein a body cover is provided on a side of the housing toward the reading target object, and the body cover adheres to the housing.

9. A paper sheet distinguishing apparatus for reading a paper sheet while moving at least one of an image sensor unit and the paper sheet, wherein the image sensor unit is capable of reading the paper sheet by receiving light from the paper sheet, the image sensor unit comprising:

a light condenser that collects light from the paper sheet;

an image sensor that receives the light collected by the light condenser and converts the received light into an electric signal;

a housing that has an elongated shape that houses the light condenser and the image sensor; and a rigid member that has an elongated shape and is provided on a side surface elongated in an elongated direction of the housing, wherein the housing has a plurality of positions for fixation on the side surface, the rigid member is fixed to the side surface of the housing at at least two positions among the plurality of positions for fixation, and a warping amount adjusting part is provided between the positions at which the rigid member is fixed to the side surface, the warping amount adjusting part being capable of holding a warping amount in a direction of an optical axis of the light condenser of the housing by intervention of a warping amount adjusting member between the rigid member and the housing.

10. An image reading apparatus for reading a reading target object while moving at least one of an image sensor unit and the reading target object, wherein the image sensor unit is capable of reading the reading target object by receiving light from the reading target object, the image sensor unit comprising:

a light condenser that collects light from the reading target object;

an image sensor that receives the light collected by the light condenser and converts the received light into an electric signal;

a housing that has an elongated shape that houses the light condenser and the image sensor; and a rigid member that has an elongated shape and is provided on a side surface elongated in an elongated direction of the housing, wherein the housing has a plurality of positions for fixation on the side surface, the rigid member is fixed to the side surface of the housing at at least two positions among the plurality of positions for fixation, and a warping amount adjusting part is provided between the positions at which the rigid member is fixed to the side surface, the warping amount adjusting part being capable of holding a warping amount in a direction of an optical axis of the light condenser of the housing by intervention of a warping amount adjusting member between the rigid member and the housing.

11. An image forming apparatus, comprising:

an image reading part that reads a reading target object while moving at least one of an image sensor unit and the reading target object; and an image forming part that forms an image, wherein the image sensor unit is capable of reading the reading target object by receiving light from the reading target object, the image sensor unit comprising:

a light condenser that collects light from the reading target object;

an image sensor that receives the light collected by the light condenser and converts the received light into an electric signal;

a housing that has an elongated shape that houses the light condenser and the image sensor; and a rigid member that has an elongated shape and is provided on a side surface elongated in an elongated direction of the housing, wherein the housing has a plurality of positions for fixation on the side surface, the rigid member is fixed to the side surface of the housing at at least two positions among the plurality of positions for fixation, and a warping amount adjusting part is provided between the positions at which the rigid member is fixed to the side surface, the warping amount adjusting part being capable of holding a warping amount in a direction of an optical axis of the light condenser of the housing by intervention of a warping amount adjusting member between the rigid member and the housing.

* * * * *